April 10, 1956  C. L. MUZZI  2,741,123
LIQUID LEVEL MEASURING DEVICE
Filed March 26, 1954  2 Sheets-Sheet 1
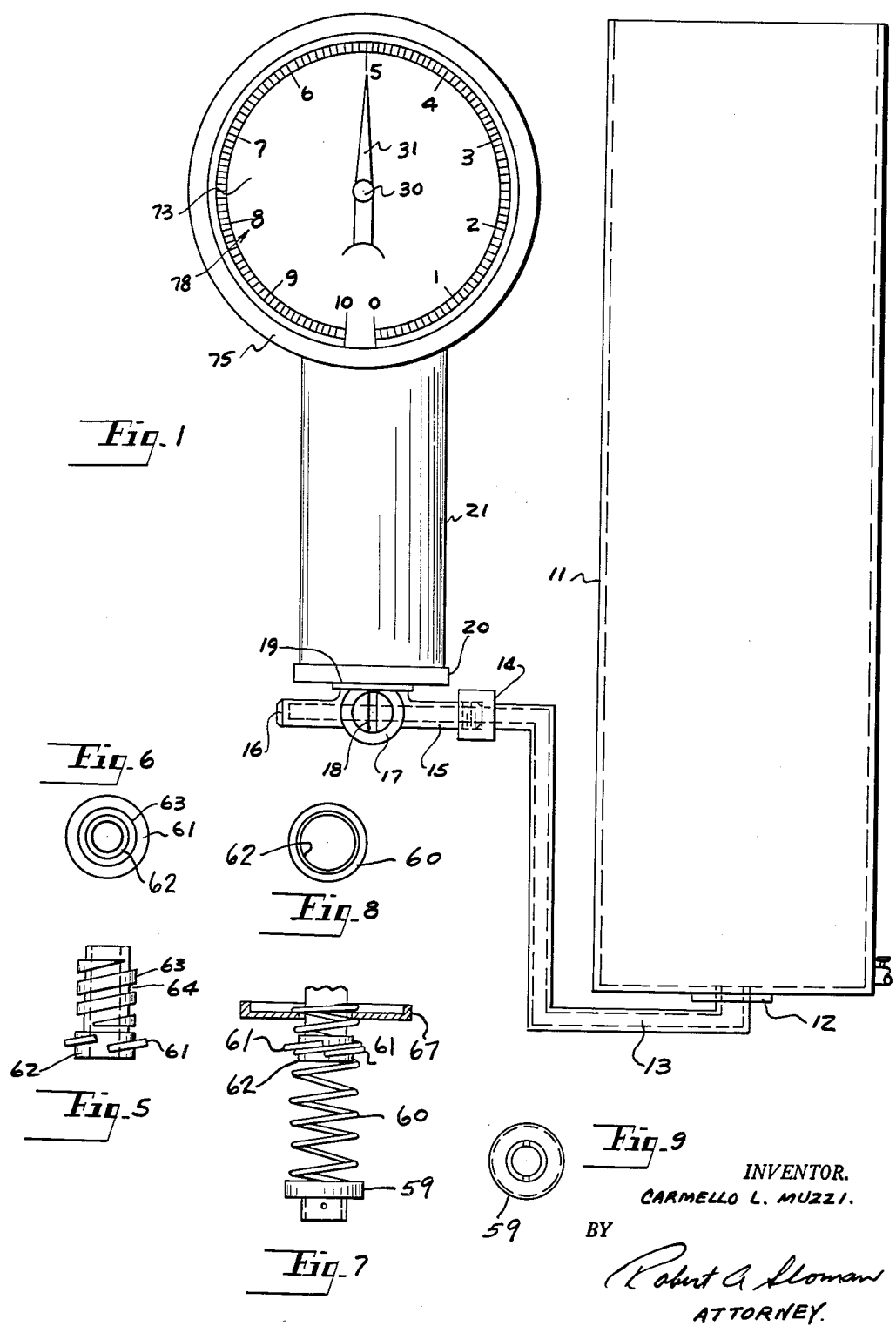
INVENTOR.
CARMELLO L. MUZZI.
BY
Robert G. Sloman
ATTORNEY.

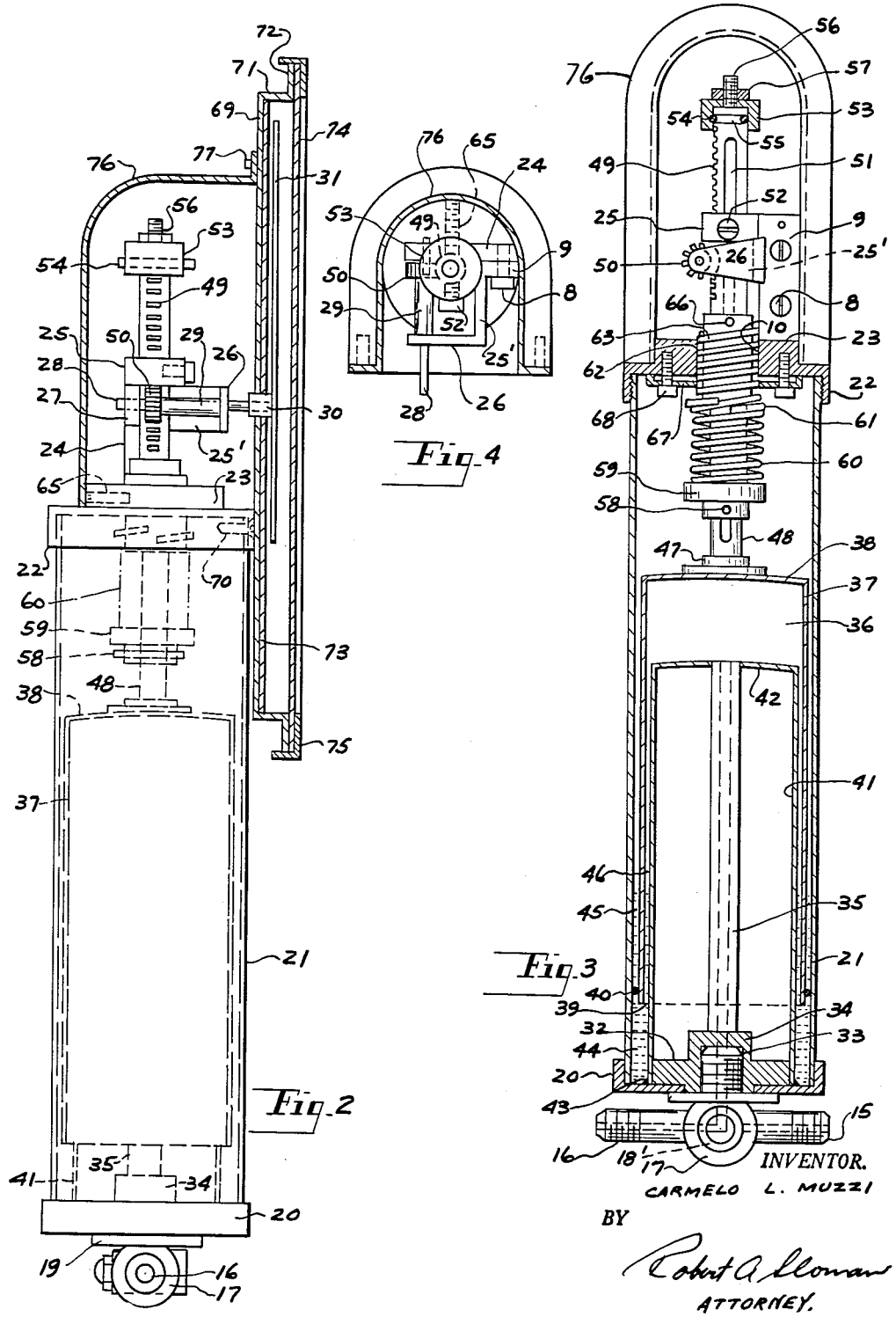

United States Patent Office 2,741,123
Patented Apr. 10, 1956

2,741,123

LIQUID LEVEL MEASURING DEVICE

Carmelo L. Muzzi, Detroit, Mich.

Application March 26, 1954, Serial No. 418,877

8 Claims. (Cl. 73—299)

This invention relates to a liquid measuring device whereby the hydrostatic force of a stored liquid is counteracted by a liquid of greater density and measured by the modulus of a spring.

In the measurement of a quantity of liquid in the present invention, there are three forces involved, i. e., the force of gravity of the liquid to be measured, the force of gravity of mercury and the force of a reactive spring applied at a focus. These forces are in opposition in the present device and are in a static equilibrium. If one of these forces changes, the other forces exert a dynamic force equal to the magnitude of this change. The spring utilizes this force by moving a quantity of liquid of lesser density to or from the focus and by means of a mechanism indexing in a quadrant the amplitude of this change in terms of quantity it represents.

It is the object of the present invention to provide a novel liquid measuring device which responds to the hydrostatic force of the stored liquid for indicating upon a dial the quantity thereof.

It is the further object of the present invention to provide an extremely sensitive liquid measuring device.

These and other objects will be seen from the following specification and claims, in conjunction with the appended drawings in which:

Fig. 1 is a front elevational view of the liquid measuring device connection with a container of fluid to be measured.

Fig. 2 is a side elevational view of said measuring device on an enlarged scale and partially in section.

Fig. 3 is a right side elevational view of the measuring device shown in Fig. 2 with the quadrant and cover omitted, for illustration.

Fig. 4 is a plan view of Fig. 3.

Fig. 5 is an elevational view of the spring mounting adjusting screw.

Fig. 6 is a plan view thereof.

Fig. 7 is a fragmentary elevational view of the control spring as it would appear under tension.

Fig. 8 is a plan view thereof; and

Fig. 9 is a bottom plan view thereof.

It will be understood that the above drawings illustrate merely a preferred embodiment of the invention, and that other embodiments are contemplated within the scope of the claims hereafter set forth.

Fig. 1 illustrates the storage tank 11 containing a quantity of liquid to be measured by the present liquid measuring device, said tank having an outlet fitting 12 adapted to receive one end of conduit 13, the other end of said conduit being removably joined as at 14 to the fluid inlet fitting 15 of the measuring device.

Said fitting has an outlet 16 and intermediate said outlet and fitting 15 is a valve housing 17. Rotatable valve 18 has a control valve element 18' shown in Fig. 3, whereby communication may be selectively established between conduit 13 and tube 35 of Fig. 3, or between said tube and the outlet 16.

The fitting 15—16—17 is connected at 19 to the closure cap 20 which surrounds the lower end and forms a part of cylindrical housing 21.

Said housing has a top wall formed by the preferably threaded closure cap 22, which has an upstanding cylindrical portion 23 of reduced diameter as shown in Fig. 3, said top wall 22—23 being centrally apertured as at 10 for the purpose hereafter set forth.

Upright support 24 is mounted upon top wall 23 and has secured thereto the bearing support 9 as by the screws 8. Laterally positioned bearing 25 is carried at the upper end of support 24 and is adapted to guidably receive vertically movable tube 48.

There is also secured to support 24, the bearing base 25' and the bearing arm 26, there being a transverse aperture in the outer end of arm 26, as well as in support 24 through which is journaled the rotative shaft 28. As shown in Fig. 2, a pinion 50 is mounted upon shaft 28 and secured thereto, there being a suitable spacer 29 interposed between said pinion and bearing arm 26.

Shaft 28 extends centrally through quadrant housing 69 and through quadrant 73 and has secured upon its outer end the collar 30 of indicator needle 31.

Referring to Fig. 3 upon housing cap 20 there is provided a cylindrical element 32 which forms a part of the bottom wall of said housing, and which has an upstanding cylindrical formation 34 with a central bore which is threaded to receive the threaded end 33 of the pipe fitting 13—16. In communication with fitting 33 there is provided an upright tube 35, the lower end of which is joined to the cylindrical projection 34, and the upper end of which is joined to and extends through the top wall 42 of the closed cylinder 41, whose lower end is secured as by the weld 43 to cap 20.

Cylinder 41 is of less diameter than housing 21, thereby defining between said housing and cylinder an annular upright chamber which is adapted to receive a column 44 of relatively dense fluid, such as mercury, for illustration.

There is also positioned within housing 21 and loosely surrounding cylinder 41, a second cylinder 37 which is loosely arranged intermediate the inner wall of housing 21 and cylinder 41, thereby defining a pair of concentric annular upright chambers 45 and 46 up into which the column of mercury 44 partially rises, as shown in Fig. 3.

Second cylinder 37 includes a top wall 38 which is spaced above cylinder top wall 42, thereby defining a measuring chamber which is in communication with annular chamber 46.

The lower end of second cylinder 37 is open as designated at 39, and there is positioned between said lower end and the inner wall of the housing the ball bearings 40 for spacing said cylinder intermediate said housing and first cylinder 41 and guiding its vertical movements.

Upright tube 48 is arranged axially of cylinder 37 and secured at its lower end to the cylinder top wall 38 as at 47. Formed upon said tube throughout a portion of its length, is the rack gear 49 which is at all times in mesh with indicator controlling pinion 50 upon bearing support 25—26.

Thus, vertical movements of tube 48 will control rotary movements of indicator needle 31 with respect to quadrant 73 of Fig. 1, which has marked thereon a series of indicia 78. Covering said quadrant is a glass 74 and securing the glass to the quadrant housing 69—71—72 is the annular flanged rim 75.

Tube 48 has an elongated transverse slot 51 formed therethrough, a portion of which slidably and cooperatively receives screw 52 which projects inwardly of bearing 25 for retaining said tube against rotation yet permitting free vertical adjustments thereof.

The adjusting sleeve 53 is rotatably secured upon the upper end of tube 48 by virtue of the annular slot 55 formed in said tube and the locking ring 54 carried in said sleeve and registerable within said annular slot.

Elongated threaded shaft 56 threadedly engages rotatable sleeve 53 and projects loosely down through tube 48, there being a suitable lock nut 57 at its upper end as shown in Fig. 3.

There is provided adjacent the lower end of tube 48 a spring supporting cup 59 which loosely surrounds said tube and which carries a transverse pin 58 which extends through slot 51 of said tube and is secured to the lower end of shaft 56. By this construction the spring supporting cup 59 may be longitudinally adjusted with respect to tube 48.

Coiled spring 60 loosely surrounds tube 48 and is supported at its lower end within cup 59. The upper end of said spring is partially threaded over a pair of opposed helix segments 61 projecting outwardly from the lower end of adjustable screw 62, which has a series of continuous helix threads 63 defining the spiral slot 64.

The screw 62 is rotatably positioned within the bore 19 of housing cover 23 and is supported in the desired rotated position of adjustment by the transverse screw 65 shown in Fig. 2, which projects inwardly through housing top wall 23 with its outer end retainingly positioned within said helix slot 64.

Openings 66 at the upper end of screw 62 permit manual rotation of said screw relative to the retaining screw 65 for thus raising and lowering screw 62 within housing wall 23. This in turn regulates the tension without disturbing coiled spring 60. Centrally apertured plate 67 receives screw 62, is spaced slightly below top wall 23 and secured thereto by the screws 68.

The quadrant housing 69 is secured in an upright position adjacent the upper end of housing 21 as by the screws 70, said housing including the cylindrical portion 71 within which is positioned quandrant 73; said housing having an annular peripheral flange 72 against which is positioned the glass 74 retained in position by the cap 75.

There is provided a formed housing 76 which is supported upon housing cap 22, said housing being secured as at 77 to the quadrant housing 79, and being removable to permit access to the internal mechanism of the present measuring device.

In operation, if the gauge is set at the base of fluid storage chamber 11, a compression type of spring 60 is used. The gauge is primed by operating movable cylinder 37 in cooperation with two-way valve 18 as a hand operated pump to thereby expel air from the system including chamber 36, pipe 35 and conduit 13.

In practice, valve element 18' is turned to the position shown in Fig. 3 and the cylinder 37 is manually depressed to force out air from chamber 36 through conduit 35 and outlet fitting 16. Valve 18' is then closed and cylinder 37 permitted to return upwardly under the action of spring 60. This upward movement creates a reduced atmospheric condition in chamber 36 by which any remaining air in pipe 35 and conduit 13 may be withdrawn into chamber 36. Valve 18' is reopened and cylinder 37 again manually depressed, after which valve 18' is closed and cylinder 37 permitted to return to the position shown in Fig. 3. This operation is continued until all air has been withdrawn, and fluid begins to appear at fitting 16.

When container 11 is empty the spring 60 balances the force of gravity of movable cylinder 37, adjacent the base of the gauge throughout, with pointer 31 indexing zero upon the dial 73. A hydrostatic force in excess of this is met by a reverse force of spring 60.

In regulating the gauge when container 11 is full, the quantity of the liquid is computed to the prevailing temperature. Any index variation is corrected by regulating the tension of the spring 60 through rotation of spring adjusting nut 62. Additionally, there will be a further adjustment made by adjusting the position of the spring with respect to tube 48 carrying rack gear 49. This is accomplished by manual rotation of threaded sleeve 53 for effecting longitudinal adjustment of threaded shaft 56 to which spring 60 is anchored as at 58.

If the gauge is set at the top of column 11, an extension type of spring is used, and the gauge is primed as above described. If container 11 is empty, the spring balances the force of gravity of the liquid in the connecting tubing at the base of the gauge and pointer 31 will index zero on dial 73, and the mercury 44 will rise in inner chamber 46 relative to movable cylinder 37 to counteract this force.

When tank 11 is full the spring counteracts the force of gravity of the movable cylinder 37, pointer 31 indexing to full on dial 73.

If the gauge is set intermediate the base and top of tank 11, the present gauge performs in accordance with a combination of the two previous examples as to setting; but the spring will have a ratio of expansion to compression as is the ratio of the position of the gauge to the top or bottom of the container.

The mercury will fall first in inner space 46, and then rise in outer space 45 relative to cylinder 37, thus doubling the capacity of the gauge.

It will be noted that this gauge is adapted for measuring the quantity of a liquid in a tank which may vary from time to time as liquid is drawn therefrom. On the other hand, the present gauge may be employed for measuring the pressure of gas or the extent of a vacuum within a sealed tank, such as tank 11.

Furthermore, by exhausting the air from the upper interior end of the gauge, the present gauge may be employed for measuring variations in atmospheric pressure.

Having described my invention, reference should now be had to the claims which follow for determining the scope thereof.

I claim:

1. A liquid measuring device comprising an upright cylindrical housing having top and bottom walls, an upright closed cylinder positioned axially within said housing, spaced adjacent to and inwardly of its inner wall and secured to said bottom wall defining an upright annular chamber therebetween adapted to contain a column of mercury, a second cylinder open at its lower end loosely positioned over said first cylinder adjacent thereto intermediate said first cylinder and housing with its lower end partially projected down into said mercury column defining a pressure chamber within said second cylinder above said first cylinder and also defining an annular chamber between said cylinders and a concentric annular chamber between said housing and second cylinder, said concentric annular chambers being of equal cross-sectional area, an elongated upright vertically movable tube centrally mounted on top of said second cylinder movably extending through the top wall of said housing, a rack on said tube, an upright indicia bearing quadrant mounted upon said housing and projecting thereabove, an upright bearing support on said top wall, a shaft journaled upon said support and projecting loosely through the center of said quadrant at right angles to the plane thereof, an indicator needle secured on one end of said shaft, a rack pinion secured to said shaft in mesh with said rack, an upright tube within said first cylinder with one end projecting through the upper end thereof in communication with said pressure chamber, and with its other end projecting through the bottom wall of said housing adapted for communication with the interior of a liquid storage container at its lower end, a vertically adjustable screw loosely surrounding and coaxial with said tube threaded through said top wall, and a coiled spring suspended at its upper end from said screw and depending therefrom, and at its other end supportably joined to said vertically movable tube for suspending it and normally resisting upward and downward movements thereof.

2. A liquid measuring device comprising an upright cylindrical housing having top and bottom walls, an upright closed cylinder positioned axially within said housing, spaced inwardly of its inner wall and secured to said bottom wall defining an upright annular chamber therebetween adapted to contain a column of mercury, a second cylinder open at its lower end loosely positioned over said first cylinder intermediate said first cylinder and housing with its lower end partially projected down into said mercury column defining a chamber within said second cylinder above said first cylinder and also defining an annular chamber between said cylinders, an elongated upright vertically movable tube centrally mounted on top of said second cylinder movably extending through the top wall of said housing, a rack on said tube, an upright indicia bearing quadrant mounted upon said housing and projecting thereabove, an upright bearing support on said top wall, a shaft journaled upon said support and projecting loosely through the center of said quadrant at right angles to the plane thereof, an indicator needle secured on one end of said shaft, a rack pinion secured to said shaft in mesh with said rack, an upright tube within said first cylinder with one end projecting through the upper end thereof in communication with said chamber and with its other end projecting through the bottom wall of said housing adapted for communication with the interior of a liquid storage container at its lower end, a threaded shaft loosely extending down through said movable tube and adjustably joined at its upper end to said tube, the lower end of said tube being transversely slotted, and a coiled spring surrounding said tube secured at its upper end to said top wall and joined at its lower end to said shaft within said tube.

3. The liquid measuring device of claim 2, and a vertically adjustable screw loosely surrounding and coaxial with said tube mounted on said top wall, the upper end of said spring being secured to said vertically adjustable screw.

4. The liquid measuring device of claim 2, the helix angle of said adjusting screw corresponding to the helix angle of said spring.

5. The liquid measuring device of claim 2, a vertically adjustable screw loosely surrounding and coaxial with said tube mounted on said top wall, the upper end of said spring being secured to said vertically adjustable screw, and a pair of arcuate spaced spring support elements at the lower end of said vertically adjustable screw formed with the same helix angle as said spring and adapted to retainingly receive an upper portion of said spring, and threadable thereinto for changing the modulus of the spring without affecting its tension or compression.

6. In a liquid measuring device a cylindrical receptacle including a top wall, a cylindrical housing axially positioned therein, a vertically movable chamber open at its lower end positioned concentrically in said receptacle between the housing and receptacle, and dividing the space between said receptacle and housing into a pair of concentric annular inner and outer chambers of equal cross-sectional area, said receptacle containing a liquid of greater density than the liquid to be measured, said receptacle fluid being adapted to rise in said annular chambers to counteract a negative or positive force of the fluid to be measured, a vertical adjustable screw axially threaded through said top wall, a coiled spring suspended at its upper end from said screw and at its lower end supportably secured to said vertically movable chamber, and a conduit communicating with the liquid to be measured extending through said housing and communicating with the interior of said vertically movable chamber.

7. In a liquid measuring device, a housing, a vertically movable chamber therein, a coiled spring carried by said housing suspending said chamber, adjustable means interposed between said spring and said chamber to permit longitudinal adjustment of said chamber relative to the housing, a rack on said chamber adapted to actuate an indexing mechanism on a quadrant, a support on said housing concentric with the rack mechanism and slidably receiving said rack, a spring modulus regulator adjustably mounted on and depending from said support having enlarged thread means thereon of the same pitch as said spring, said thread means meshing into said spring supporting the load thereof, manual rotation of said regulator changing the effective length of the spring without disturbing its tension or compression.

8. The liquid measuring device of claim 7, said adjustable means including a threaded shaft within said rack threadedly connected at its upper end to said rack and adjustable with respect thereto, and at its lower end joined to said spring for effecting an initial longitudinal setting of the chamber relative to the housing.

References Cited in the file of this patent

UNITED STATES PATENTS

| | | |
|---|---|---|
| 697,970 | Bomhard | Apr. 22, 1902 |
| 1,174,124 | Connet | Mar. 7, 1916 |
| 1,892,468 | Ledoux | Dec. 27, 1932 |
| 2,203,523 | Cunningham | June 4, 1940 |
| 2,625,042 | Binford | Jan. 13, 1953 |